(12) United States Patent
Bach et al.

(10) Patent No.: US 6,439,225 B2
(45) Date of Patent: Aug. 27, 2002

(54) COLLAPSIBLE PORTABLE OUTDOOR FIREPLACE

(75) Inventors: Kent Bach, Villa Park; Jeffrey Grady, Naperville; Dave Henke, Hawthorn Woods, all of IL (US)

(73) Assignee: Fleming Sales Company, Addison, IL (US)

( * ) Notice: Subject to any disclaimer, the term of this patent is extended or adjusted under 35 U.S.C. 154(b) by 0 days.

(21) Appl. No.: 09/795,997

(22) Filed: Feb. 28, 2001

Related U.S. Application Data (63) Continuation-in-part of application No. 09/526,764, filed on Mar. 16, 2000, now Pat. No. 6,286,503.

(51) Int. Cl.[7] .................................................. F24B 1/181
(52) U.S. Cl. .......................... 126/519; 126/50; 126/40; 126/9 R; 126/9 B; 126/25 A; 126/304 A; 126/544
(58) Field of Search ................................ 126/519, 9 R, 126/9 B, 25 A, 50, 40

(56) References Cited

U.S. PATENT DOCUMENTS

| | | | | |
|---|---|---|---|---|
| 3,105,483 A | * | 10/1963 | Bryan | 126/25 A |
| 4,535,749 A | * | 8/1985 | Schlosser et al. | 126/25 R |
| D284,929 S | * | 8/1986 | Schlosser et al. | D7/332 |
| 4,688,542 A | * | 8/1987 | Isbell | 126/25 A |
| 4,741,321 A | * | 5/1988 | Squires | 126/25 R |
| 5,598,834 A | * | 2/1997 | Grady | 126/276 |
| 5,713,344 A | * | 2/1998 | Gilbert | 126/25 R |
| 5,832,915 A | * | 11/1998 | Skidmore et al. | 126/25 R |
| 5,960,788 A | * | 10/1999 | Bach et al. | 126/276 |
| D436,284 S | * | 1/2001 | Mak | D7/332 |
| 6,220,240 B1 | * | 4/2001 | Grady et al. | 126/276 |

* cited by examiner

Primary Examiner—Henry Bennett
Assistant Examiner—Kathryn Ferko
(74) Attorney, Agent, or Firm—Cook, Alex, McFarron, Manzo, Cummings & Mehler, Ltd.

(57) ABSTRACT

A collapsible, portable outdoor fireplace with a fire screen assembly is easily broken down into its constituent components, which are stored in a space between the cover and bottom members of the fireplace. A fire screen assembly is supported between the cover and bottom members and includes a series of individual screen panels that are hinged together. The fireplace has a support structure that supports it off the ground and includes pairs of legs that are attached to the bottom member. The legs may extend either up through the cover and bottom members or alongside the bottom member. These support legs terminate in handle portions. The legs include moveable joints that permit the handles to be collapsed upon the cover member to retain the cover and base member together.

15 Claims, 9 Drawing Sheets

COLLAPSIBLE PORTABLE OUTDOOR FIREPLACE

REFERENCE TO RELATED APPLICATIONS

This is a continuation-in-part application of prior application Ser. No. 09/526,764, filed Mar. 16, 2000 now U.S. Pat. No. 6,286,503.

BACKGROUND OF THE INVENTION

The present invention generally relates to portable fireplaces, and more particularly, to a portable outdoor fireplace having a collapsible nature.

Fixed outdoor fireplaces, such as those made from brick, masonry and the like have been known for years. Portable outdoor fireplaces have recently entered the marketplace and have evidenced a distinct popularity. The size of these portable fireplaces is small and their structures are such that they permit them to be easily moved from one location to the other. Such fireplaces are found in the patent literature.

U.S. Design Pat. No. Des. 293,191, issued Dec. 15, 1997 describes a portable outdoor fireplace which incorporates the top and bottom covers of the well-known Weber "Kettle" grill spaced apart by an internal framework that defines a fire pit area. The internal framework must be removed to close the top and bottom covers together. No provision is made for storing the internal framework within the top and bottom covers, and hence these type fireplaces require a large area for storage.

Another outdoor fireplace is described in U.S. Pat. No. 5,596,980, issued Jan. 28, 1997 that is similar to the structure shown in the aforementioned '191 design patent but which further includes a functional fire screen assembly in which a plurality of screens are fixed within a cylindrical frame assembly. This frame assembly includes top and bottom ring members that are spaced apart by columns. The fire screen assembly is large and must be removed and stored separately from the top and bottom covers. This fireplace cannot be easily disassembled and stored in a minimum amount of space because the internal framework of it cannot be easily disassembled.

Another outdoor fireplace is described in U.S. Pat. No. 5,832,915 issued Nov. 10, 1998 in which two hollow rectangular top and bottom members support a fire screen. The bottom member has a series of slots formed in it that receive individual legs. The legs may be inserted into similar slots or the top member to hold the two members together. The legs are slid into slots and are therefore prone to sliding out over when the unit is picked up because they are not attached to the unit. As such, they are prone to being lost. The legs of the unit do not remain on the fireplace when it is in a collapsed configuration.

The aforementioned patent application, Ser. No. 09/526,764, illustrates a fireplace with a handle assembly with supports that extends through a set of opposing rims, or hanger. The cover member is able to be moved up and down along these support members. However, moving the cover member may cause movement of the support members, thus jeopardizing the stability of the fireplace.

The prior art therefore lacks a collapsible portable outdoor fireplace having a support assembly that remains attached to the base when the fireplace is collapsed and which avoids the aforementioned stability problem.

SUMMARY OF THE INVENTION

The present invention is directed to a portable outdoor fireplace with a collapsible that overcomes the aforementioned shortcomings.

It is therefore a general object of the present invention to provide a collapsible fireplace that is suitable for outdoor use and having a large fire chamber, but which is constructed so that it may be easily assembled and disassembled.

Another object of the present invention to provide a collapsible portable outdoor fireplace and grill that includes opposing base and cover portions, a fire screen assembly supported on the base portion and which extends up from the base portion to define an enclosed fire area therewithin, the fire screen assembly being easily collapsible upon itself for storing between the top and bottom cover members, the fireplace having a handle assembly that is movable between two positions, the handle assembly serving as a means for retaining the top and bottom cover members together when the fireplace is collapsed.

A still further object of the present invention is to provide an outdoor fireplace having a base member that supports a fire screen assembly having a plurality of screen panels, the screen assembly being from a large configuration to a small configuration for storage between the top and bottom members thereof, and at least one of the screen panels forming a door of the assembly through which access to the interior of the fireplace may be had.

Yet another object of the present invention is to provide a portable outdoor fireplace having top and bottom cover members, the cover members being spaced apart from each other by a fire screen assembly, the fireplace including a support structure attached thereto and which supports the bottom member off of the ground, the support structure including pairs of support legs, the legs having upright extensions that pass through the top and bottom cover members so that the top cover member is slidable on the extensions between an open and a collapsed configuration, the extensions being hinged for folding upon the top cover member to retain the fireplace in a collapsed configuration.

A further object of the present invention is to provide a collapsible portable outdoor fireplace and grill having opposing base and cover portions, the base portion of which providing a support combustible material, the fireplace including a fire screen assembly formed from multiple screen panels, some of which are hinged together and others are attached together with pop-out hinge pins, the fire screen assembly being capable of being disassembled into a flat shape and dimensioned to fit between the base and cover portions of the fireplace, the fireplace further having two supports attached to its base member at opposite sides thereof, the supports extending upright and having joints associated therewith interposed between handle and leg portions thereof so that the handles may be pivoted toward each other into engagement with opposing latches that are formed as part of a handle assembly on the top of the cover portion.

The present invention accomplishes these objects in accordance with one principal aspect thereof by utilizing a pair of hollow, top and bottom members that serve as respective cover and base members for the fireplace. A fire screen assembly is supported on the bottom member in order to provide an enclosure for retaining combustible material within the fireplace. The fire screen assembly includes a plurality of individual screen panels that are hinged together, with one or two of the screen panels serving as hinged doors that may be opened without interfering with the cover or bottom member.

In another principal aspect of the present invention, the portable outdoor fireplace is easily collapsible without the need for tools. Due to their hinged nature, the fire screen panels may be collapsed, or folded, into a flat configuration so that the assembly can be easily stored between the cover and base members. The fireplace is supported off of the ground by a support assembly which includes pairs of posts disposed at the opposite ends of the fireplace. These posts extend through at least the cover member of the fireplace in a manner so that the cover member may be slid up and down along the posts away from or near the base member. The cover member is normally supported by the fire screen assembly, but when the fire screen assembly need be removed, the top member is supported on a pair of catch members that are disposed on the posts. In this configuration, the spacing between the top and bottom fireplace members is increased so that the fire screen assembly may be easily removed from the fireplace.

The posts also define as a handle structure for the fireplace. In this regard, they include movable joints that permit movement in one direction but not in another direction, so that the posts may be folded upon the fireplace cover member, thereby reducing the height of the fireplace when it is collapsed. The posts may further have handle portions disposed on their ends and, when collapsed upon the top member, the handle portions may engage the fireplace cover member in a snap-fit type of engagement in order to hold them in place on the cover member and hold the cover and bottom members together. This aspect of the present invention enables the portable outdoor fireplace of the present invention to be assembled, used, and disassembled without the requirement of tools.

The fire screen assembly is hinged together and has a preferred rectangular configuration so that it may be collapsed upon itself into a flat screen structure. The flatness of this collapsed screen structure permits it to be easily stored between the top and bottom members of the fireplace. Additionally, the top and bottom fireplace members each have an outwardly extending flange that runs continuously around the edges thereof. This flange not only support a grill and the fire screen assembly, but also provides an area through which the fireplace posts extend. The flanges further permit the fire screen assembly to fit inside of the posts, thereby saving time and effort when removing the fire screen assembly and when collapsing the fireplace.

In a second embodiment of the invention, the cover and base portions have rims of reduced width at the ends of the fireplace. The support members in this embodiment do not extend up through the rims but are attached to the base member only. These support members have joints formed therein at a level that is above the top of the cover member so that top ends of the supports may be pivoted toward each other and the center of the cover member. A handle member is provided on the cover with two opposing receptacles into which the tops of the supports latch.

Also in this embodiment, the screen door panels of the fire screen assembly can be disconnected from the rest of the screen assembly so that they can lie flat on the remaining screen panels between the cover and base members. The support members include telescoping leg portions that can be disassembled and stored between the base and cover members.

These and other objects, features and advantages of the present invention will be clearly understood through a consideration of the following detailed description.

BRIEF DESCRIPTION OF THE DRAWINGS

In the course of this detailed description, the reference will be frequently made to the attached drawings in which:

FIG. 18A is an end elevational view of the fireplace of FIG. 14;

FIG. 18B is an end elevational view of the fireplace in the collapsed condition illustrated in FIG. 16; and, FIG. 19 is an enlarged detail view, partly in section of the engagement which occurs between the fire screen assembly and the base and cover members.

DETAILED DESCRIPTION OF THE PREFERRED EMBODIMENTS

Figure 1:
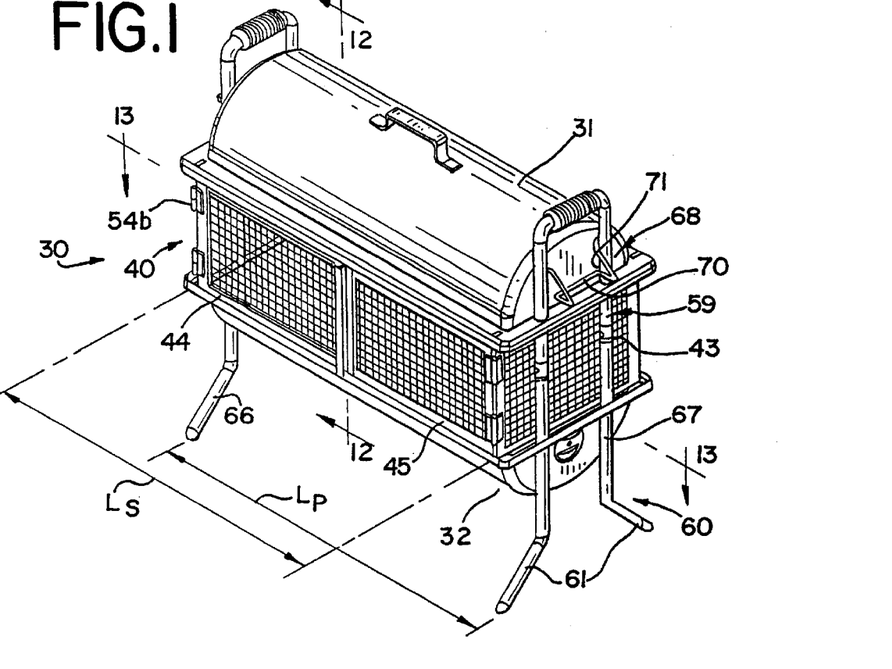
FIG. 1 is a perspective view of a compact, portable outdoor fireplace constructed in accordance with the principles of the present invention.

FIG. 1 illustrates a portable outdoor fireplace 30, constructed in accordance with the principles of the present invention. The fireplace 30 includes opposing top and bottom members 31, 32, with each of the members 31, 32 being hollow. In the embodiment shown, the top and bottom members 31, 32 have a rectangular perimeter 34 and a semi-circular or semi-cylindrical cavity 35. These members may be easily formed out of sheet metal, such as by drawing or stamping.

Each of the members 31, 32 has a rim portion 36 that includes what may be considered as formed from a pair of flanges 38, 39. One of the flanges 38 extends generally horizontally while the other of the flanges 39 extends generally vertically. This is illustrated best in FIG. 12. The combination of the horizontal and vertical flanges cooperatively define the rim portion 36 which supports the fire screen assembly 40 and a cooking grill 80, if desired, as well as support structure. This rim portion 36 extends around the perimeter of the hollow cavity defined in both the top and bottom members 31, 32. The hollow cavity 35 portion of the bottom member 32 serves as an area that holds combustible material, such as wood, charcoal, or the like, as well as supports, if desired, a cooking grill. A series of support tabs, or pegs, 50 may be provided to support a grate 49 that holds combustible material off of the bottom member 31 and provides a channel for air underneath the material. These pegs 50 are shown as screws that extend through holes in the walls of the bottom member 32, but may also be tabs attached to the interior face thereof. It will be understood that the particular configuration of the top and bottom members illustrated, i.e., the semi-cylindrical configuration, are for purposes of example only and that many other suitable configurations, such as hemispherical, may be used.

Figure 6:
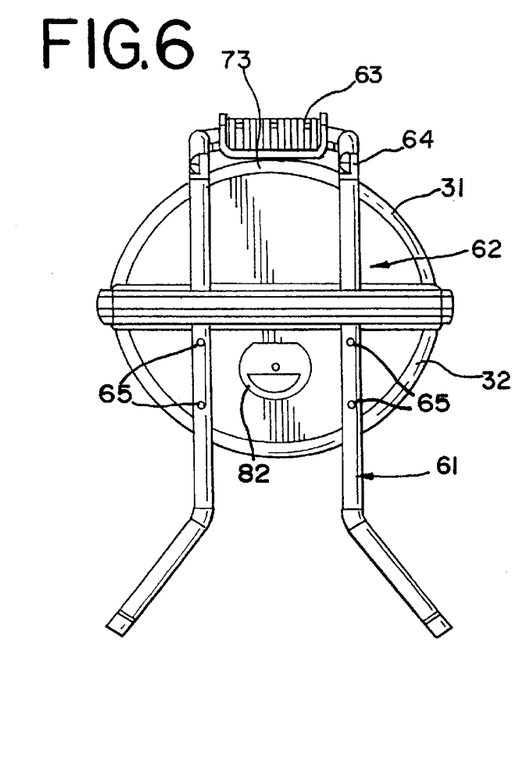
FIG. 6 is an end elevational view of the fireplace of FIG. 5.

The top and bottom members 31, 32 have similar shapes and as shown in the drawings, the two members may be somewhat mirror images of each other. In this depicted semi-cylindrical configuration, they cooperatively define, when the fireplace is collapsed, a distinctive overall cylindrical configuration. (FIG. 6.) A fire screen assembly 40 is provided that extends around the rim portion 36 and which provides a protection to the fireplace in order to retain burning embers and other hot material that is generated in the use of the fireplace.

Figure 3:
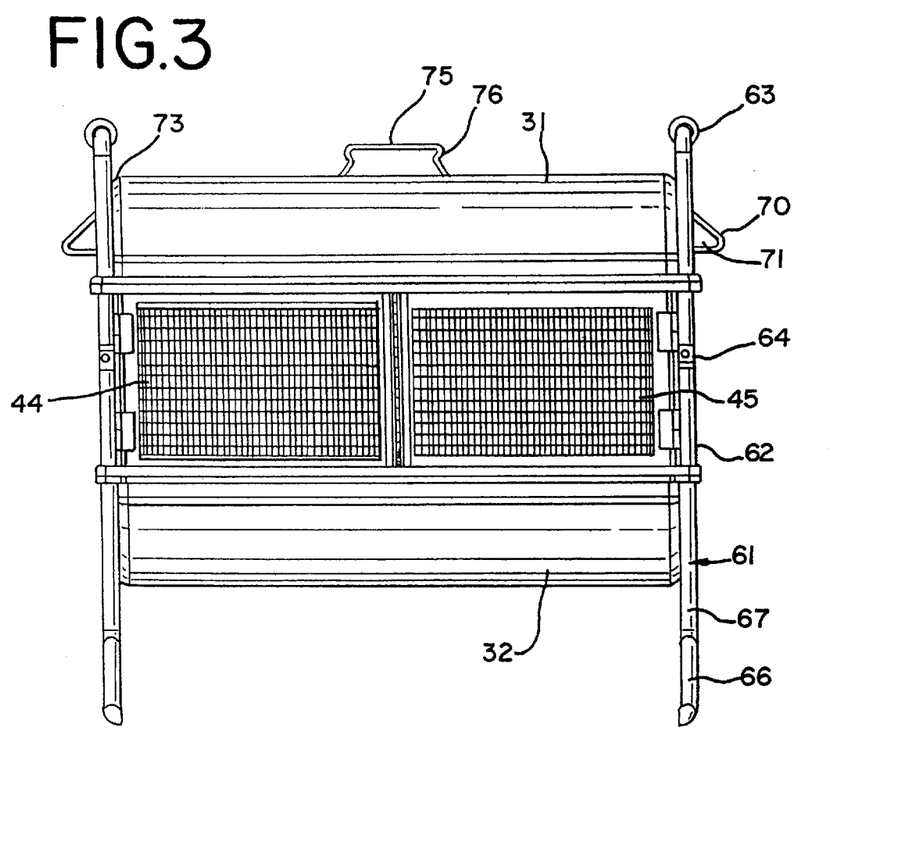
FIG. 3 is a side elevational view of the fireplace of FIG. 1.
Figure 4:
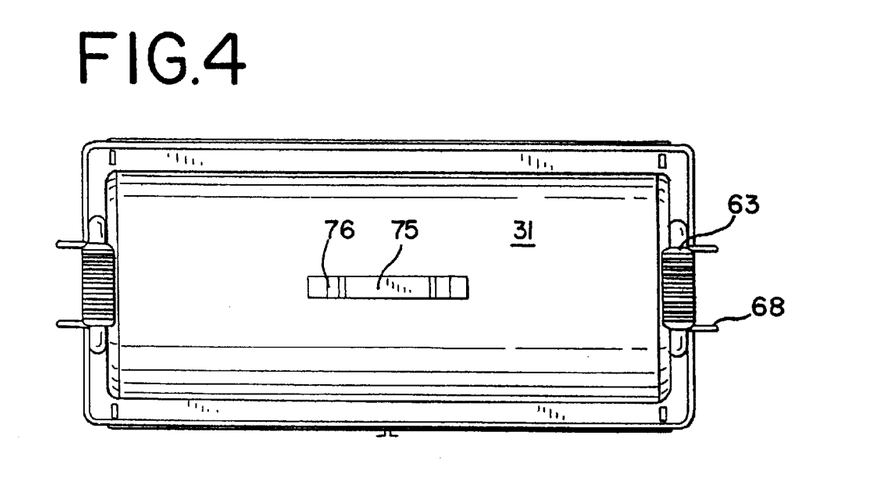
FIG. 4 is a top plan view of the fireplace of FIG. 1.
Figures 7, 9:
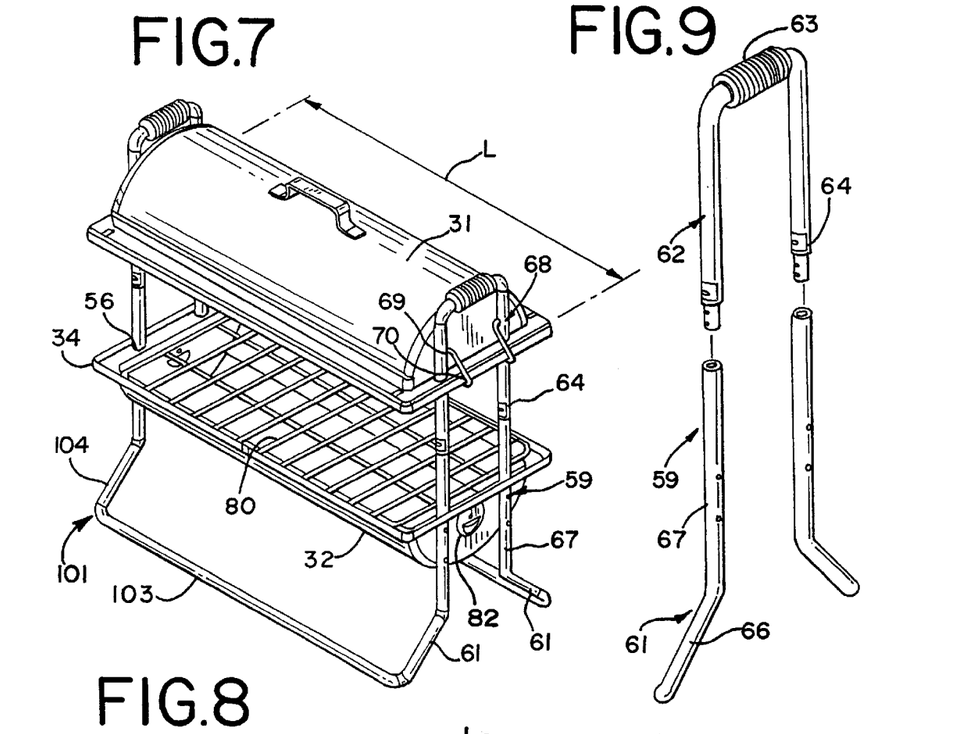
FIG. 7 is a perspective view of the fireplace of FIG. 1 with its fire screen assembly removed for complete access to the interior grill portion thereof.
FIG. 9 is an exploded view of a support assembly used to support the fireplace off the ground.

Turning to FIGS. 3 and 7, the fire screen assembly 40 is provided in a "segmented" format. That is, the assembly 40 includes a plurality of individual screen panels 41–45 that are interconnected together at approximately the corners of the top and bottom members 31, 32. In the preferred embodiment illustrated, the fire screen assembly 40 includes five such screen panels 41–45. One of the screen panels 41 forms the rear of the screen assembly 40 and extends for approximately slightly less than the entire length L of the fireplace. Two of the screen panels 42, 43 form side panels of the screen assembly 40 and extend for approximately slightly less than the entire width W of the fireplace 30. The front of the fire screen assembly 40 may include a pair of screen door panels 44, 45 that cooperatively extend to approximately the front length of the fireplace. These panels 44, 45 preferably have an extent such that they meet in approximately the middle of the front of the fireplace. The screen door panels 44, 45 may include outwardly extending flanges 51 that can serve as handles which a user may grasp to open and close the door panels 44, 45. The screen door panels 44, 45 may also include tabs 52 on their interior faces to engage the edge rim 36 of the bottom member 32 to restrain the door panels from opening inadvertently.

Figure 8:
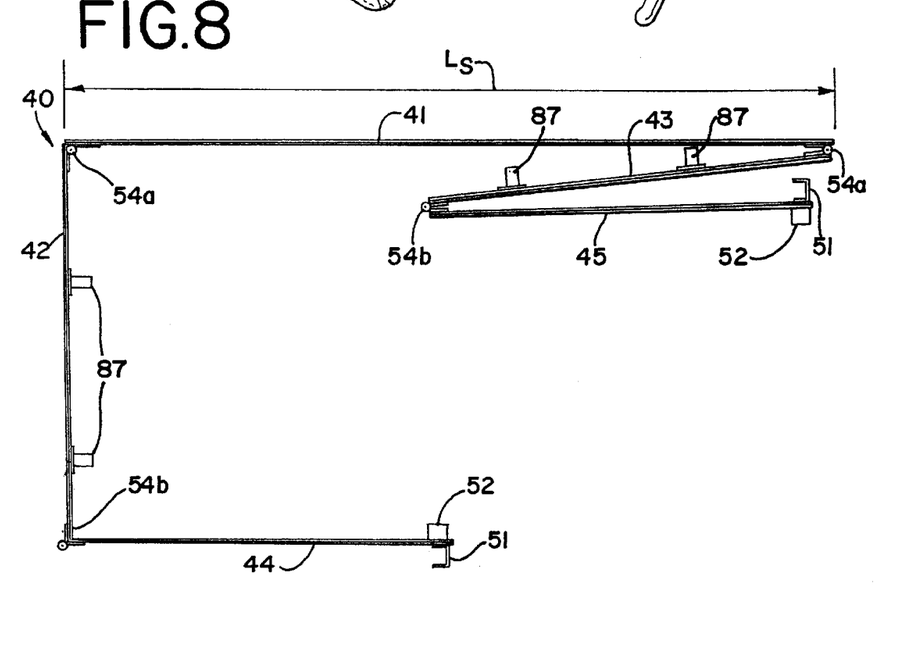
FIG. 8 is a top plan view of the fire screen assembly used in the fireplace of FIGS. 1–7 and illustrating one manner in which it may be folded upon itself for storage within the fireplace.

The door screen panels 41–45 are all hinged together so that, as illustrated in FIG. 8, they may be folded upon themselves. In this regard, and as depicted in FIG. 8, the two side panels 42, 43 are preferably hinged so that they fold inwardly upon the rear screen panel 41. The screen door panels 44, 45 are connected to the side screen panels 42, 43 so that they may fold upon the side screen panels in the opposite direction than the direction in which the side screen panels fold upon the rear screen panel. The screen assembly 40 may thus be folded up in an accordion-style fashion to take an overall flat configuration. The screen panels 41–45 are connected together using conventional hinges 54a, 54b.

In order to effect the preferred folding, the hinges may be alternatingly placed on the interior and exterior corners of the fire screen assembly 40. In this manner, the hinges 54a connecting the rear screen panel 41 to the side screen panels 42, 43 are placed along interior faces, while the hinges 54b connecting the side screen panels 42, 43 to the screen door panels 44, 45 are placed along exterior faces. The hinges 54b may be of the type that have hinge slots that receive pins disposed on the screen door panels 44, 45 so that the door panels may be removed when necessary, so that the fireplace may be used with only three screen panels 41, 42 and 43.

Importantly, the screen assembly 40 has an overall length $L_s$ that is less than the intervening length $L_p$ between the pairs of posts 59. This difference in length permits the screen assembly 40 to be at least partially folded up and easily removed from the fireplace 30.

Figure 13:
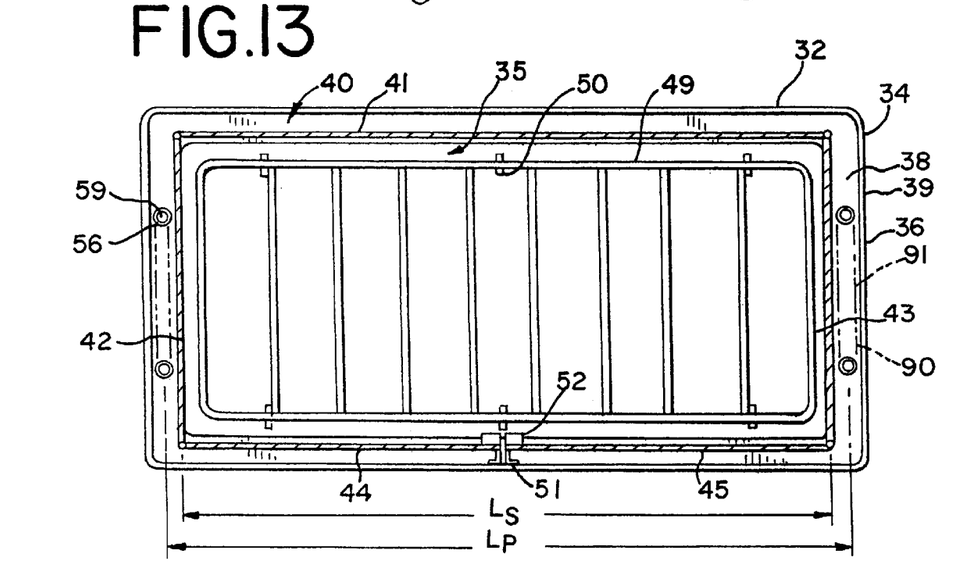
FIG. 13 is a sectional view of the fireplace of FIG. 1 taken along lines 13—13 thereof.

FIG. 13 best illustrates the relationship of the fire screen assembly dimensions to the dimensions of the bottom member 32. As mentioned previously, the interior rim 36 of both cover and base members 31, 32 is wide and is defined by the horizontal flange portion 38 of the rim 36. This horizontal flange portion 38 is wide enough to accommodate openings 56 therein that are sized to receive the posts 59 of the fireplace support structure 60. The openings 56 are disposed within the boundaries of the flange 38, while the length $L_s$ of the screen assembly 40 is less than the length between the posts 59. In this manner, the posts 59 and screen assembly 40 will not interfere with each other. Also, the fire screen assembly 40 may be removed without taking the top off because the support structure 60 is not structurally or otherwise connected to the fire screen assembly 40.

The support structure 60 includes pairs of legs 61 that are mounted to the ends of the bottom member 32 such as by bolts 65 or any other suitable fastening means. The legs 61, as illustrated, have an angled portion 66 for contacting the ground and a vertical, or upright portion 67 that extends upwards and which is attached to the bottom member 32. These upright portions 67 extend through the openings 56 in the rim flanges 38 and thus serve, in combination with the angled portions, to maintain the bottom member 32 off the ground.

The support structure 60 further includes handle portions 63 that are preferably disposed at the ends of extension portions 62 of the legs 61. These extension portions 62 are illustrated best in FIG. 9 and, as shown may be of a slip-fit nature, although other suitable constructions may be used. The extension portions 62 contain hinges, moveable joints, such as pivot members or knuckles 64, that allow part of the extension portions 62, including the handle portions 63 to be moved between a first operative position, such as the upright position shown in FIGS. 1–3 and 7, and a second operative position, such as the flat position shown in FIGS. 5, 6, 10 and 11. Preferably, these joints 64 permit movement in one direction (toward the cover member 31 and back) but do not permit movement in the opposite direction (to the outer side of the fireplace 30) so that the posts 59 will remain erect, when needed. The support structure 60 may thereupon be considered to have at least a C-shaped configuration in which the legs 61 act as the free ends of the "C", while the handle portions 63 would act as the backbone of the "C". These posts 59, as do the entire support structure 60, serve to maintain the cover member 31 in alignment and opposition with the base member 32.

Figure 2:
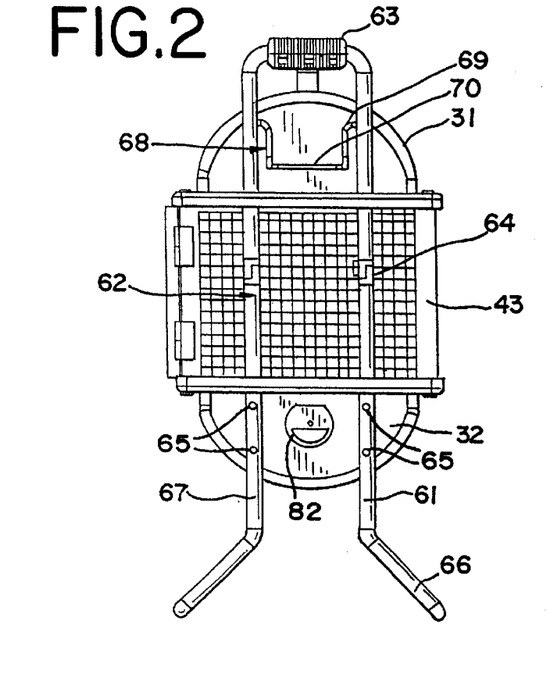
FIG. 2 is an end view of the fireplace of FIG. 1.

This first operative position is suitable for use with the fire screen assembly 40 in place on the bottom member 32, as illustrated in FIGS. 1 and 3, as well as the extended configuration illustrated in FIG. 7, where the fire screen assembly 40 has been removed. In this extended configuration, the vertical distance between the cover and base members 31, 32 exceeds the height of the fire screen assembly 40, so that it may be removed and collapsed into a flat configuration where it may be stored in the cavity formed by the cover and base members 31, 32. In order to hold the cover member 31 in this extended position, the support structure 60 includes means for supporting the cover member 31, shown illustrated as taking the form of catches 68. The catches 68 illustrated are wire formed members with two ends 69 interconnected by an intervening hook portion 70. (FIGS. 2 and 7.) The hook portion 70 is of such a configuration that it preferably includes a nest 71 in which the rim 38 of the cover member 31 will seat, as shown in FIG. 7. Alternate styles of support means are also contemplated and the catches 68 illustrated are merely exemplary of one form thereof. These catches 68 may be easily moved into and out of engagement with the cover member rim 38.

Figure 5:
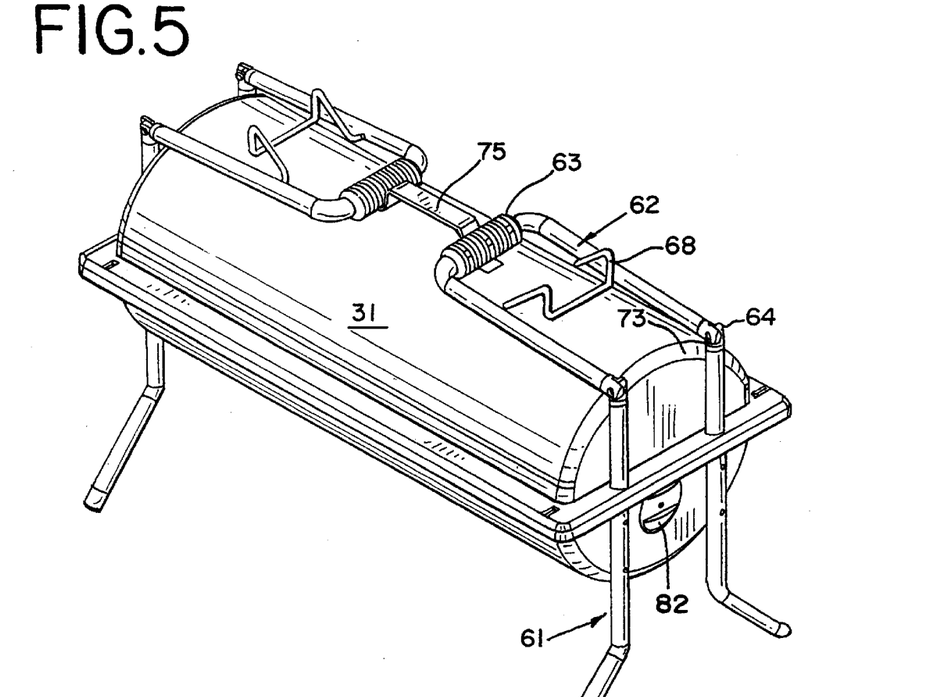
FIG. 5 is a perspective view of the fireplace of FIG. 1 in a collapsed configuration wherein the fire screens of the fireplace are accommodated between the top and bottom members thereof.

The moveable joints 64 of the support structure 60 permit the extension portions 62 to be folded upon the cover member 31 as best illustrated in FIGS. 5 and 6. The joints 64 are preferably located on the support structure so that they will approximately coincide with the edges 73 of the cover member 31 when the cover member 31 is placed directly on the base member 32. In this regard, the upper part of the extension portions 62 may be folded down upon the cover member 31 as shown in FIG. 5. In order to facilitate the sliding movement of the cover member 31 upon the posts 59, the cover member 31 has a handle 75 disposed thereon. The handle 75 has means for engaging the posts 59 in the form of a pair of recesses 76 that are sized to receive and retain thereon the handle portions 63 therein in a snap-fit type of engagement. These recesses 76 are shown as semi-circular so as to match the configuration of the handle portions 63 and to thereby facilitate the snap-fit engagement. Other configurations may be used that are complementary in shape to the handle portions and other means, such as latches that may be attached to either the cover member 31 of the handle portions 63 themselves are also contemplated.

Figure 10:
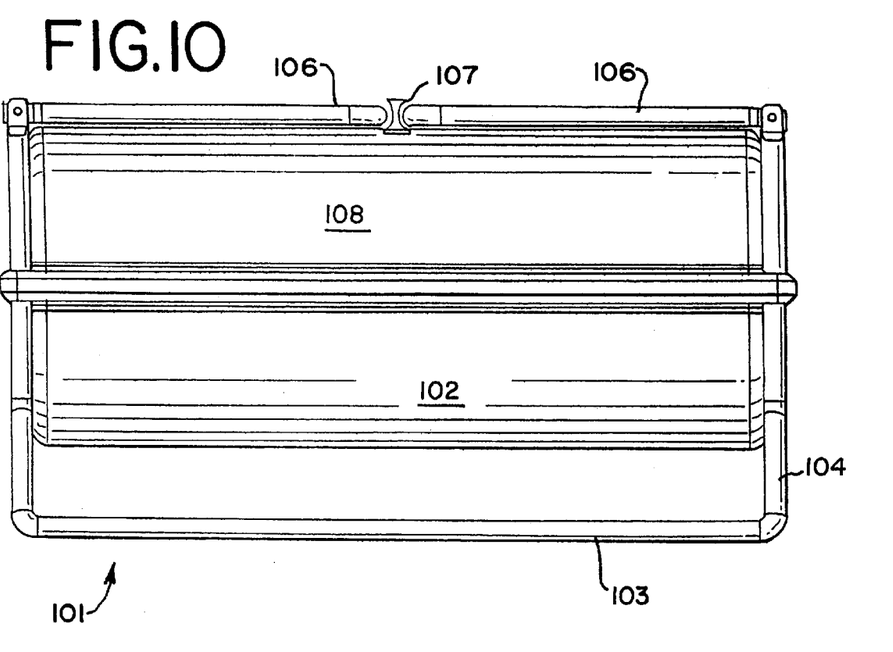
FIG. 10 is a side elevational view of an alternate embodiment of a fireplace of the present invention, illustrating an alternate handle arrangement.
Figure 11:
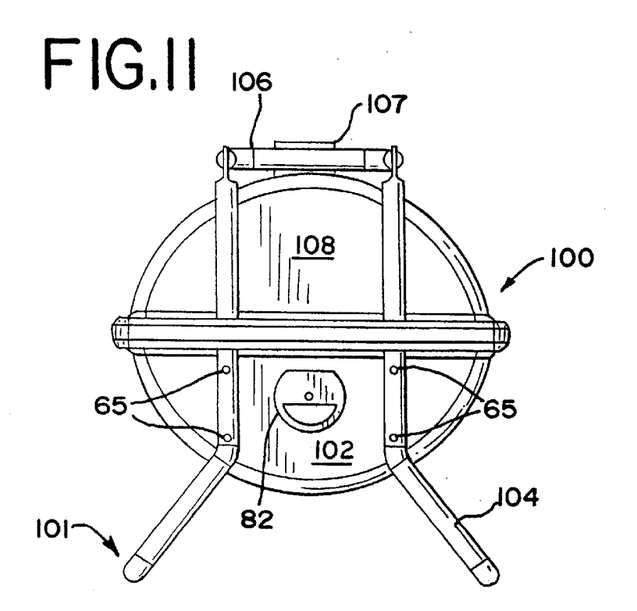
FIG. 11 is an end elevational view of the fireplace of FIG. 9.

FIGS. 7 and 10–11 illustrate an alternate embodiments of a fireplace 100 of the present invention. In this embodiment, the support structure 101 that holds the bottom member 102 off the ground has a runner 103 that interconnects the pairs of legs 104 together. The handle portions 106 engage a clip 107 attached to the cover member 108.

Figure 12:
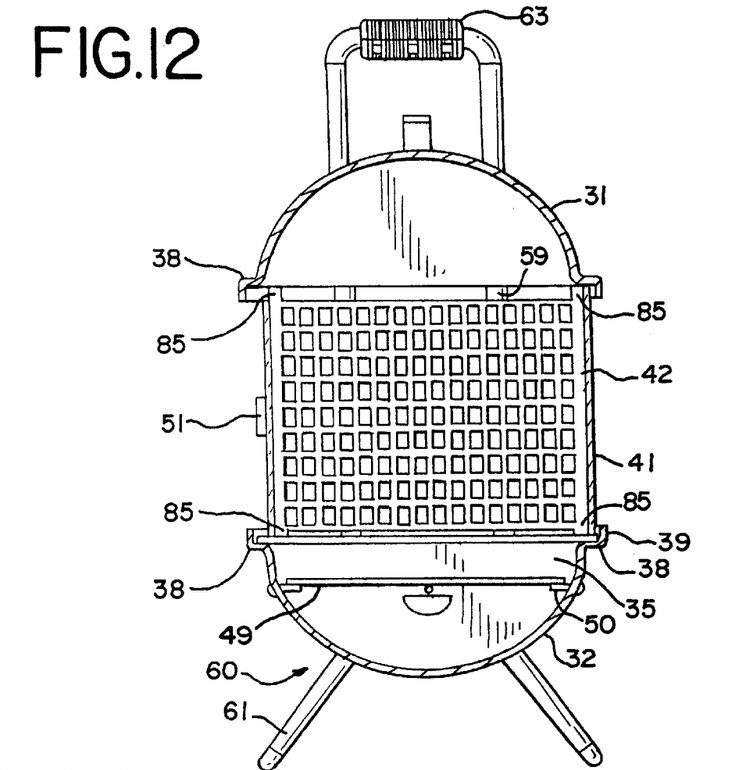
FIG. 12 is a sectional view of the fireplace of FIG. 1, taken along lines 12—12 thereof.

The fireplace 30 may also contain one or more vents 82 disposed in the endwall of the cover or base members 31, 32. The vents may be adjusted to control the amount of air entering the fireplace 30 in the area beneath the grate 49. Turning to FIG. 12, it can be seen that the side screen panels 42, 43 each have support feet 85 that rest upon the interior of rims 36 of the cover and base members 31, 32. These feet 85 preferably may fit outside of or within openings of an elongated grill member 80. The screen assembly 40, as shown in FIG. 8, may include support members 87 arranged at different elevations to provide the user with a choice of grilling distances.

The openings 56 that enclose the support structure 60 are shown in the drawing as capturing the cover member 31, in that the cover member cannot be lifted off of the fireplace because the handle portions 63 cannot pass through the cover member rim portion 36. In an alternate embodiment, as shown by the phantom lines 90 in FIG. 13, the portion of the rim 36 that extends between the openings 56 may be removed so that the cover and base members have a slot 91 formed therein rather than a pair of openings. This slot 91 would be large enough to accommodate the upper part, i.e., the handle portions 63, of the support structure 60 so that the cover member 31 may be lifted off of it without requiring the handle portions 63 to be removed.

FIGS. 14–18 illustrates another embodiment of a fireplace constructed in accordance with the principles of the present invention. This fireplace 200 has a hollow base member 201 and a hollow cover member 202 of similar dimension, with each member having respective hollow cavities 211, 212. Each such member is preferably semi-cylindrical as illustrated and has two opposing ends 204 that extend transverse to the curved sidewall 205 that gives the members and their cavities their semi-circular or semi-cylindrical shape. Each such member 201, 202 may have a rim portion 209, 210 that extends around the perimeter of their respective cavities 211, 212. These rim portions, or flanges 209, 210 provide support for both a cooking grill 214 and a fire screen assembly 215.

Figure 14:
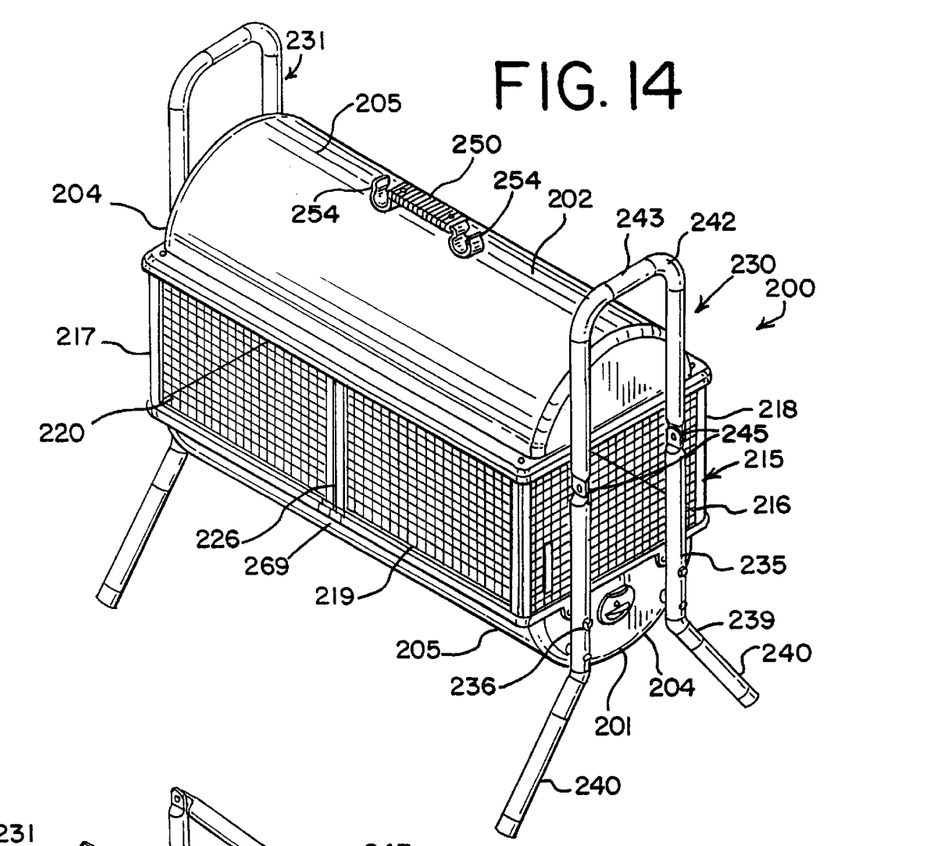
FIG. 14 is a perspective view of a second embodiment of a fireplace constructed in accordance with the principles of the present invention.
Figure 15:
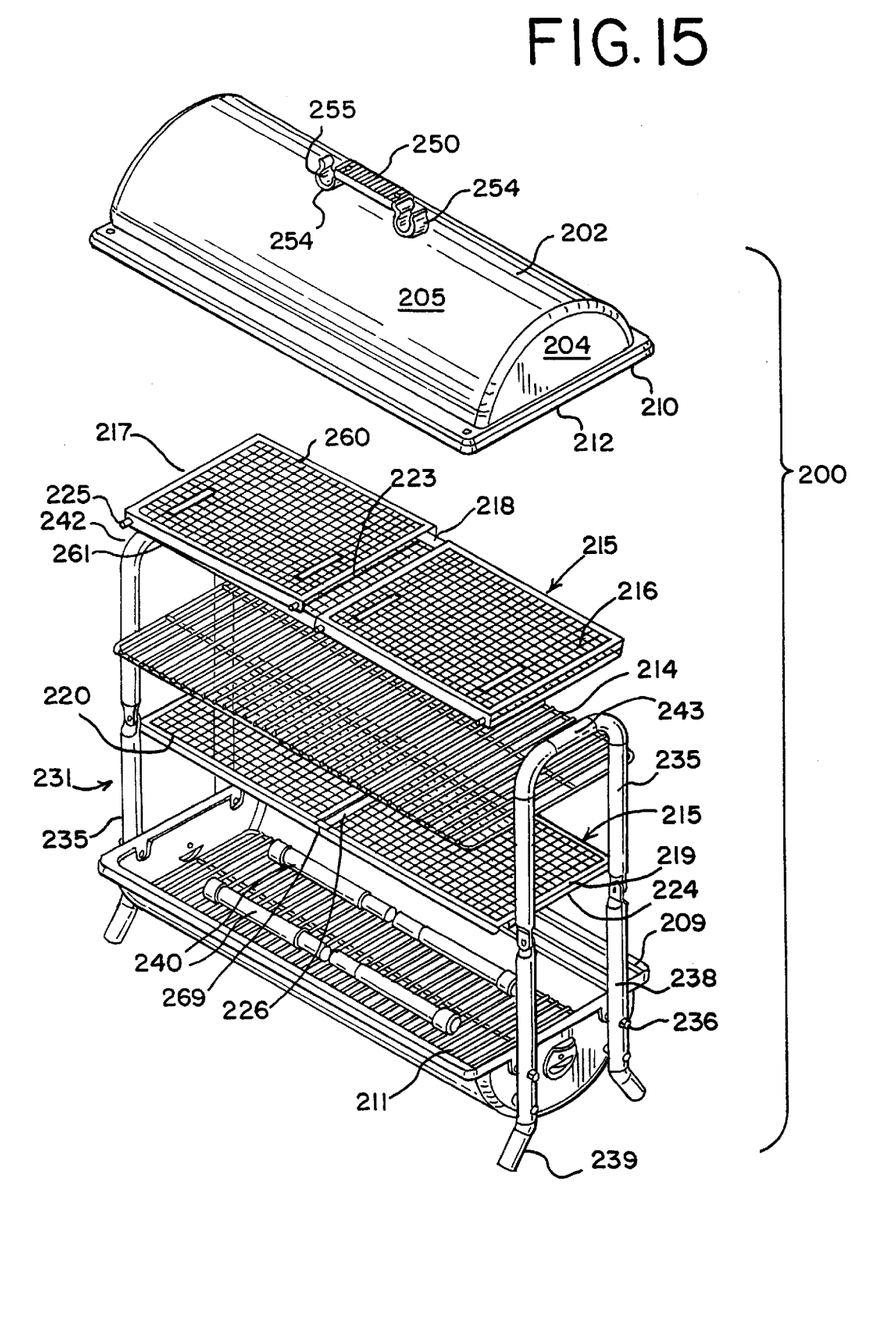
FIG. 15 is an exploded view of the fireplace of FIG. 14 illustrating certain components thereof disassembled therefrom for storage between the base and cover members.

The rim portions 209, 210 are generally rectangular in their extent and a fire screen assembly 215 is provided to partially enclose the hollow area of the base member 201 by itself or completely enclose it when the cover member 202 is applied to it. (FIG. 14.) The fire screen assembly 215 includes, as illustrated, four or more individual screen panels 216–220 that are preferably interconnected by hinges 222. The two side screen panels 216, 217 and rear screen panel 218 are preferably interconnected by permanent hinges so that the three screen panels can be moved as a unit.

Figures 18A, 18B, 19:
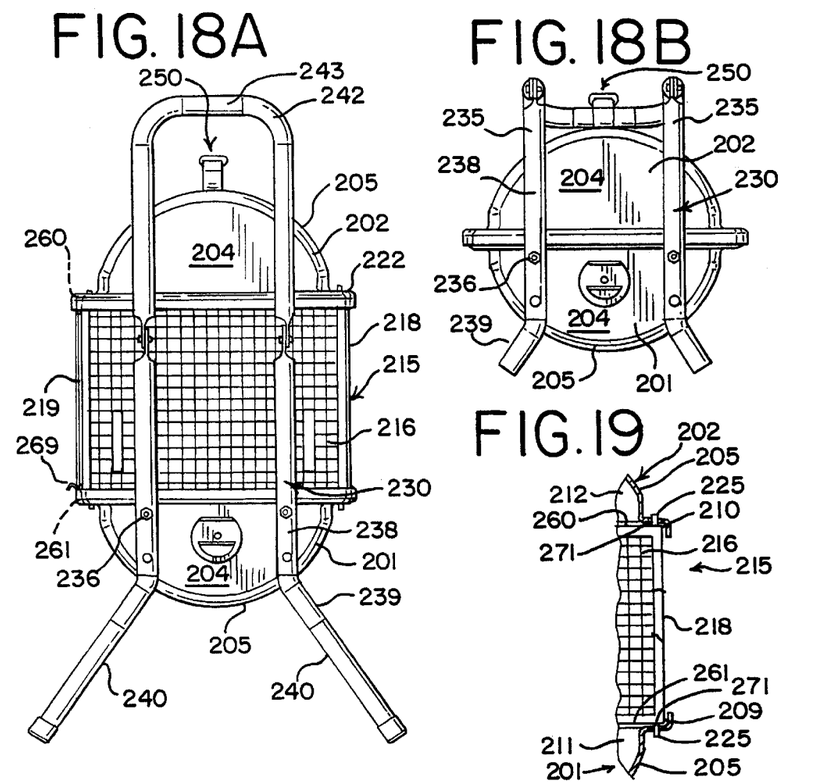

The two screen panels 216, 217 may include, as shown, hinge members 223 that notably connect with like hinge members 224 on the door panels 219 and 220. These hinge members permit the door panels 219, 220 to be removed and stored separately between the base and cover members 201, 202. The three other screen panels 216–218 have engagement tabs or posts 225, preferably on both their top and bottom edges 260, 261 that engage the base and cover members to hold the screen panels in place. As shown in FIG. 19, these engagement posts 225 are located at or near the corners of the fire screen assembly 215 and project upwardly or downwardly through slots 271 that are formed in the outer rims 209, 210 of the base and cover members 201, 202.

The door panels 219, 220 may also include handles 226 by which a user can grasp to open and close the door panels 219, 220. Clips 269 (FIGS. 15 & 18A) may be located on the bottom edges 261 of the screen door panels 219, 220 for engaging the bottom cover member outer rim 209, so that when the screen door panels 219, 220 are closed, they will remain closed.

The fireplace 200 is supported by a pair of supports 230, 231 that extend upright alongside and above the fireplace 200. As shown in the drawings, each support 230, 231 includes a pair of elongated tubes 235 that are attached to the ends 204 of the fireplace by a suitable attachment means, such as a series of bolts 236. Each tube has an upright section 238 that ends in an angled portion 239. The lower part of these tubes are angled to form leg portions of the fireplace that support it off the ground, and these angled portions serve as leg portions of the support members. Extensions 240 are preferably provided to increase the height at which the base member may be supported off the ground.

The support member tubes 235 are preferably hollow and are open at their lower ends so the elongated leg extensions 240 may be telescopingly engaged with them (i.e., the end of one fits within the end of another) to provide a greater level of support off of the ground. These leg portions are of a sufficient length to support the fireplace 200 on the ground and still be stored, when disassembled, in the space between the base and cover members 201, 202 that is defined by their two matching cavities 209, 210.

Figure 16:
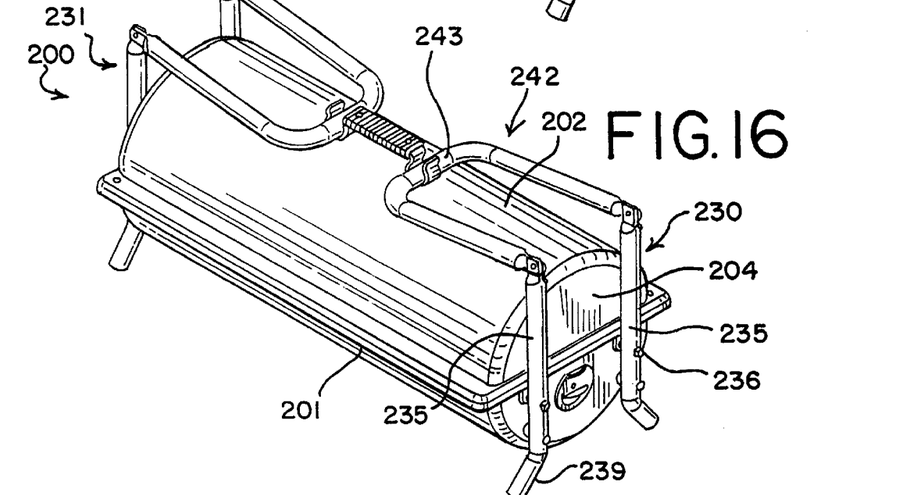
FIG. 16 is a perspective view of the fireplace with FIG. 14 with its collapsible components stored between the top and bottom portions thereof.

At their upper ends, the support tubes 235 are likewise preferably interconnected at their top ends 242 to form a pair of handle portions 243. The handle portions 243 permit the fireplace to be moved by a user when in its assembled condition (FIG. 14) and as stated below, serve to hold the cover member 202 upon the base member 201 when the fireplace is in a collapsed condition. (FIG. 16.) Joints 245 are present in the support tubes 235 and are interposed between the handle portions 243 and the mounting bolts 236. The joints 245 may be formed as pressed tubes joints shown where the ends of the support members are flattened and pinned together, or other suitable joints may be used.

Figure 17:
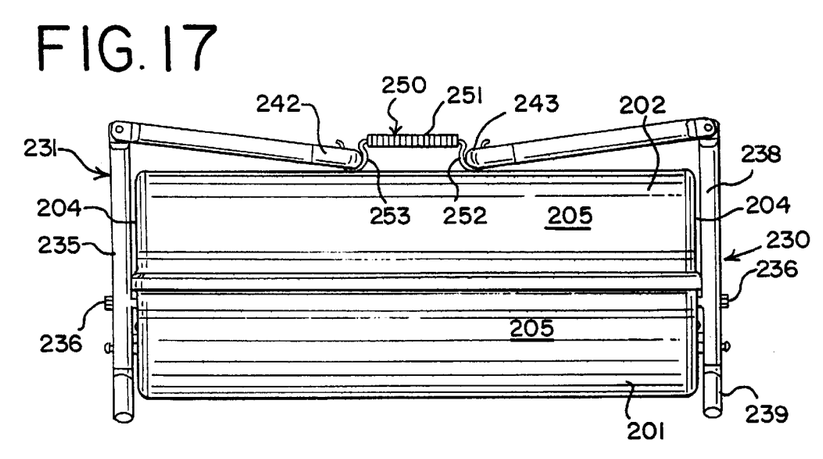
FIG. 17 is a side elevational view of the fireplace of FIG. 16.

These joints 245 permit pivoting movement of the upper portions of the support tubes 235 and are preferably located at a distance above the exterior surface of cover member 202. (FIG. 18A.) The support handle portions 243 may be then pivoted into a storage position where it is engaged with the cover member 202 as illustrated in FIGS. 16 & 17. In this regard, the cover member 202 is provided with a handle 250 having a backbone portion 251 extending between two free ends 252, 253.

The handle 250 has a general U-shape that is inverted as illustrated, so that the two free ends 252, 253 may engage the cover member, such as by welding or screws, and also each include a clip 254 having a C-shape that defines a slot 255 into which the support handle portions latch. The slots 255 open upwardly as shown, but they may oriented in other directions. The U-shaped handle and C-shaped clips are arranged in inverted fashion with the handle 250 facing downwardly and the clips 254 facing upwardly. The handle portions 243 and the clips are complementary in shape so that the handle portions 243 may be retained therein to securely hold the cover member 202 in place upon the base member 201.

In this embodiment, the support members are located exterior of and alongside the base and cover member rims 209, 210 so that the cover member 202 may be easily removed or put into place on top of either the fire screen assembly 215 or the base member 201, without fear of compromising the stability of fireplace.

While the preferred embodiment of the invention have been shown and described, it will be apparent to those skilled in the art that changes and modifications may be made therein without departing from the spirit of the invention, the scope of which is defined by the appended claims.

We claim:

1. A portable outdoor fireplace, comprising:
   a base member for supporting and burning combustible material therein;
   a collapsible fire screen assembly supported by said base member, said fire screen assembly defining a fire chamber for containing and substantially enclosing the combustible material within said base member, said fire screen assembly including a plurality of individual screen panels that stand upright upon said base member;
   a cover member for covering a top of said fire screen assembly in opposition to said base member outer rim; and,
   a support structure for supporting said base member off the ground, the support structure including two pairs of support members attached to opposite ends of said base member, each pair of support members extending alongside said base member opposite ends and upwardly above said base member, each pair of support members further including leg portions extending therefrom at lower ends thereof, and handle portions interconnecting said pairs of support members together at upper ends thereof, each support member including a joint disposed therein between said leg portions and handle portions, said support member joints permitting said handle portions to be moved between first and second operative positions, where in said first operative position, said support member handle portions stand upright and in said second operative position, said support member handle portions extend laterally over said cover member at an angle from said support member leg portion, and said cover member includes a latch member that engages said handle portions when said handle portions are in said second operative position to thereby hold said cover member in a closed position on top of said base member.

2. The portable outdoor fireplace as defined in claim 1, wherein said support member leg portions extend outwardly at an angle with respect to said base member.

3. The portable outdoor fireplace as defined in claim 2, wherein said support member leg portions include extensions that telescopingly engage said support members and are detachable from said support members.

4. The portable outdoor fireplace as defined in claim 1, wherein said fire screen assembly includes a plurality of screen panels connected together, and including a rear screen panel, two side screen panels and at least one screen panel door, said rear and side screen panels being hinged together and said one screen door panel being removably hinged to one of said side screen panels so that said one screen panel door may be selectively removed from said side screen panel and laid flat upon one of said side and rear screen panels between said base and cover members.

5. The portable outdoor fireplace as defined in claim 4, wherein said fire screen assembly includes two screen door panels, each of said screen door panels being removably hinged to one of said screen side panels, and each of said screen door panels including an engagement clip for engaging said base member and retaining said screen door panels in place.

6. The portable outdoor fireplace as defined in claim 1, wherein said base and cover members each have an interior rim for contacting said fire screen assembly, said base and cover member interior rims having slots formed therein and said fire screen assembly having tabs extending therefrom that are received within said base and cover member slots.

7. The portable outdoor fireplace as defined in claim 1, further including a handle attached to said cover member, the handle having two C-shaped clip members associated therewith that are complementary in shape to said support member handle portions, each clip member having a slot disposed therein for receiving said handle portions to hold said cover member in a closed position upon said base member when said handle is in said second operative position.

8. The portable outdoor fireplace as defined in claim 7, wherein said clip member slots face upwardly.

9. The portable outdoor fireplace as defined in claim 1, wherein each of said cover and base members include a outer rim that extends around common perimeters thereof, said support members extending alongside said outer rims.

10. The portable outdoor fireplace as defined in claim 1, wherein said cover and base member each have a semicircular configuration.

11. The portable outdoor fireplace as defined in claim 4, wherein each of said screen panels are generally rectangular in shape.

12. A collapsible, portable outdoor fireplace, comprising:
- a base member for supporting combustible material therein, the base member having a predetermined configuration with an outer rim;
- a cover member having a predetermined configuration that matches that of said base member, the cover member also having a outer rim, said cover member being engageable with said base member along said outer rims thereof;
- a collapsible fire screen assembly supported on said base member for substantially enclosing said combustible material within said base member, said fire screen assembly including a plurality of individual screen panels that stand upright upon said base member to define said fire screen assembly, said screen panels being capable of being at least partially disassembled and folded upon each other into a substantially flat shape for storage in a open space defined between said base and cover members; and,
- a pair of supports for supporting said fireplace off the ground, the supports each including two elongated, hollow tubes attached to opposite ends of said base member and which have lower leg portions that extend away from said base member, the pairs of tubes being interconnected by handle portions at their top ends above said leg portions, said supports further including joints disposed therein between said handle portions and said leg portion, said joints permitting said handle portions to be moved between first and second operative handle positions, where in said first operative position, said handle portions may extend upright and above said cover member, and in said second operative position, said handle portions may be moved at an angle from said supports into contact with said cover member, said cover member having a latch assembly disposed thereon that secures both of said handle portions to said cover member such that said handle portions secure said cover member to said base member.

13. The collapsible, portable outdoor fireplace as defined in claim 12, wherein said fire screen assembly includes a rear panel, two side screen panels and at least one screen panel door, said rear and side screen panels being hinged together along interior corners of said fire screen assembly, and said one screen door panel being removably hinged to one of said side screen panels so that said screen door panel may be removed from said fire screen assembly.

14. The collapsible, portable outdoor fireplace as defined in claim 13, wherein said side screen panels of said fire screen assembly may be folded upon said rear screen panel in a flat configuration and said one screen door panel may be removed from said side screen panel, said fire screen assembly having dimensions which permit it to be stored within said open space between said cover and base members.

15. The portable outdoor fireplace as defined in claim 12, wherein said support leg portions include extension members that telescopingly engage said supports and are detachable from said supports.

* * * * *